(12) United States Patent
Hu et al.

(10) Patent No.: US 7,570,648 B2
(45) Date of Patent: Aug. 4, 2009

(54) ENHANCED H-VPLS SERVICE ARCHITECTURE USING CONTROL WORD

(75) Inventors: Cheng-Hong Hu, San Ramon, CA (US); Chin Yuan, San Ramon, CA (US); Kuo-Hui Liu, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1108 days.

(21) Appl. No.: 10/357,280

(22) Filed: Feb. 3, 2003

(65) Prior Publication Data

US 2004/0151180 A1 Aug. 5, 2004

(51) Int. Cl.
*H04L 12/28* (2006.01)

(52) U.S. Cl. .................... 370/396; 370/400

(58) Field of Classification Search .......... 370/389, 370/400, 392, 396, 390, 352, 395.1, 236.2, 370/218, 219, 231; 709/249, 238, 239, 223
See application file for complete search history.

(56) References Cited

U.S. PATENT DOCUMENTS

| | | | |
|---|---|---|---|
| 5,732,071 A | 3/1998 | Saito et al. | |
| 5,757,924 A | 5/1998 | Friedman et al. | |
| 5,790,541 A | 8/1998 | Patrick et al. | |
| 5,912,891 A | 6/1999 | Kanai | |
| 6,049,528 A | 4/2000 | Hendel et al. | |
| 6,061,728 A | 5/2000 | Mead et al. | |
| 6,188,689 B1* | 2/2001 | Katsube et al. | 370/389 |
| 6,343,330 B1 | 1/2002 | Khanna et al. | |
| 6,512,744 B1* | 1/2003 | Hughes et al. | 370/232 |
| 6,775,239 B1* | 8/2004 | Akita et al. | 370/248 |
| 6,967,927 B1* | 11/2005 | Dugeon et al. | 370/236.1 |
| 7,092,361 B2* | 8/2006 | Puppa et al. | 370/242 |
| 7,097,008 B2* | 8/2006 | Pham et al. | 188/250 B |
| 7,155,215 B1* | 12/2006 | Miernik et al. | 455/423 |
| 7,260,097 B2* | 8/2007 | Casey | 370/392 |
| 7,283,465 B2* | 10/2007 | Zelig et al. | 370/219 |
| 2001/0009550 A1 | 7/2001 | Mizuhara | |
| 2002/0118644 A1* | 8/2002 | Moir | 370/230 |
| 2002/0181457 A1* | 12/2002 | Mezeul et al. | 370/389 |
| 2003/0103522 A1* | 6/2003 | Hane | 370/462 |

(Continued)

OTHER PUBLICATIONS

Virtual Private LAN Services Over MPLs, Mar. 2002.

(Continued)

*Primary Examiner*—Hanh Nguyen
(74) *Attorney, Agent, or Firm*—Toler Law Group

(57) ABSTRACT

The present disclosure is generally directed to systems and methods associated with data communications. In a particular embodiment, a method for use of multi-protocol labels switching (MPLS) encapsulation with control word communicated over a distributed computer network is disclosed. The method includes providing MPLS virtual circuit label with the control word associated with a data packet selected from one of a customer data packet and an OAM data packet, and communicating the MPLS packet with control word and the data packet over the distributed computer network.

In another embodiment, a method of handling a data packet within a computer network is disclosed. The data packet is either an unknown unicast, multicast, or broadcast packet. The method includes encapsulating the packet into a multi-packet label switching label and a control word, the control word having a source site identity and a multi-cast identity; and distributing the packet to a plurality of sites within the computer network.

5 Claims, 4 Drawing Sheets

U.S. PATENT DOCUMENTS

| | | | |
|---|---|---|---|
| 2003/0198182 A1* | 10/2003 | Pegrum et al. | 370/225 |
| 2003/0208525 A1* | 11/2003 | Bannai et al. | 709/201 |
| 2004/0037279 A1* | 2/2004 | Zelig et al. | 370/390 |
| 2005/0213594 A1* | 9/2005 | Klink | 370/428 |
| 2006/0039374 A1* | 2/2006 | Belz et al. | 370/389 |

OTHER PUBLICATIONS

A Layman's Overview of Ethernet and Ethernet/IP, Apr. 16, 2002.
Requirements for Virtual Private LAN Services (VPLS), Feb. 2002.
Hierarchical Virtual Private LAN Service, Nov. 2001.
Virtual Private LAN Services Using Logical PE Architecture, Nov. 2001.
Decoupled Virtual Private LAN Services, Nov. 2001.
Ethernet over MPLS on Cisco 7600 Series Router, Sep. 11, 2001.
An Introduction to MPLS, Sep. 10, 2001.
MPLS eSeminar, May 30, 2001.
LAN Switching, Apr. 26, 2001.
Multiprotocol Label Switching Architecture, Jan. 2001.
MPLS Enhancements to Support Layer 2 Transport Services, 2001.
Overview of Routing Between Virtual LANs, unknown.
Introduction to vLANs, unknown.

* cited by examiner

ENHANCED H-VPLS SERVICE ARCHITECTURE USING CONTROL WORD

BACKGROUND

1. Field of the Invention

The present disclosure relates to Ethernet over multi-protocol label switching (MPLS) service.

2. Description of the Related Art

Many systems and architectures have been disclosed for handling data traffic over distributed networks. One type of system that has been recently proposed to the Internet Engineering Task Force (IETF) is an Ethernet over multi-protocol label switching (MPLS) architecture.

While the proposed system has many benefits in providing cost effective data services, this system fails to adequately take into consideration scalability issues, such as medium access control (MAC) address computational concerns for networks with large numbers of customer MAC addresses, and maintenance issues, such as providing edge-to-edge troubleshooting.

Accordingly, there is a need for improved systems and methods of providing Ethernet over MPLS.

SUMMARY

The present disclosure is generally directed to systems and methods associated with data communications. In a particular embodiment, a method for use of multi-protocol labels switching (MPLS) encapsulation with control word communicated over a distributed computer network is disclosed. The method includes providing MPLS virtual circuit label with the control word associated with a data packet selected from one of a customer data packet and an OAM data packet, and communicating the MPLS packet with control word and the data packet over the distributed computer network.

In another embodiment, a method of handling a data packet within a computer network is disclosed. The data packet is either an unknown unicast, multicast, or broadcast packet. The method includes encapsulating the packet into a multi-packet label switching label and a control word, the control word having a source site identity and a destination site identity. The destination site identity could be a multi-cast identity. The packet is distributed to a plurality of sites associated with the customer virtual private network within the computer network.

In another embodiment, a method of handling a data packet within a computer network where the destination address is known to the local node is disclosed. The method includes encapsulating the packet into a multi-packet label switching label and a control word, the control word having a source site identity and a multi-cast identity; and distributing the packet to a plurality of sites within the computer network.

In another embodiment, a method of handling a data packet at ingress node multi-tenant unit (MTU) is disclosed. The method includes receiving a data packet from a data port responsive to customer equipment; performing customer medium access control address learning; determining whether the data packet is a unicast packet and if the packet is unicast packet and destination address is known to the local node, encapsulating the data packet into a multi-packet label switching label and a control word. The control word has a provider source site identity and a provider destination site identity. If the destination address of the packet is multi-cast, broadcast or unknown unicast address, the data packet is encapsulated into a multi-packet label switching label and a control word. The control word has a provider source site identity and a provider multicast site identity.

In another embodiment, a method of handling a data packet communication is disclosed. The method includes receiving the data packet at an egress multi-tenant unit (MTU) port; performing a mapping between a source medium access control address of the data packet and a provider source site identity; removing a multi-packet label and control word from the data packet to produce an Ethernet data packet; and sending the Ethernet data packet to a destination site. In another embodiment, a method of handling a data packet communication is disclosed. The method includes receiving the data packet at provider edge device (PE); performing provider site ID learning; determining whether the data packet is a unicast packet; if the packet is unicast packet and destination Site-ID is known to the local node, forwarding the packet to the destination PE device; and if the destination Site-ID of the packet is multi-cast, broadcast or unknown unicast address, distributing the packet to a plurality of sites associated with the customer virtual private network within the computer network.

In yet a further embodiment, a method of testing data communication within a network is disclosed. The method includes generating a testing packet for communication by a multi-tenant unit; and communicating the testing packet from the multi-tenant unit to another element within the network. The testing packet includes a control word. The control word includes a site destination identification field and a site source identification field.

In another embodiment, a control word for use in connection with a distributed computer network having customer equipment at a first site where the customer equipment has a plurality of associated medium access control addresses is disclosed. The control word includes a service provider site identification field to represent a group of the plurality of medium access control addresses at the first site.

In another embodiment, a distributed computer data network of a service provider is disclosed. The distributed computer data network includes a first computing node (source multi-tenant unit); a second computing node (provider edge device); a third computing node (provider edge device) a fourth computing node (destination multi-tenant unit); and a data packet communicated between the first computing node and the second computing node, the data packet including a control word having a provider destination identification corresponding to the location of the fourth computing node. The second computing node receives the data packet and forwards the data packet to the third computing node in response to processing the provider destination identification to determine the packet destination.

DETAILED DESCRIPTION OF THE DRAWING(S)

Figure 1:
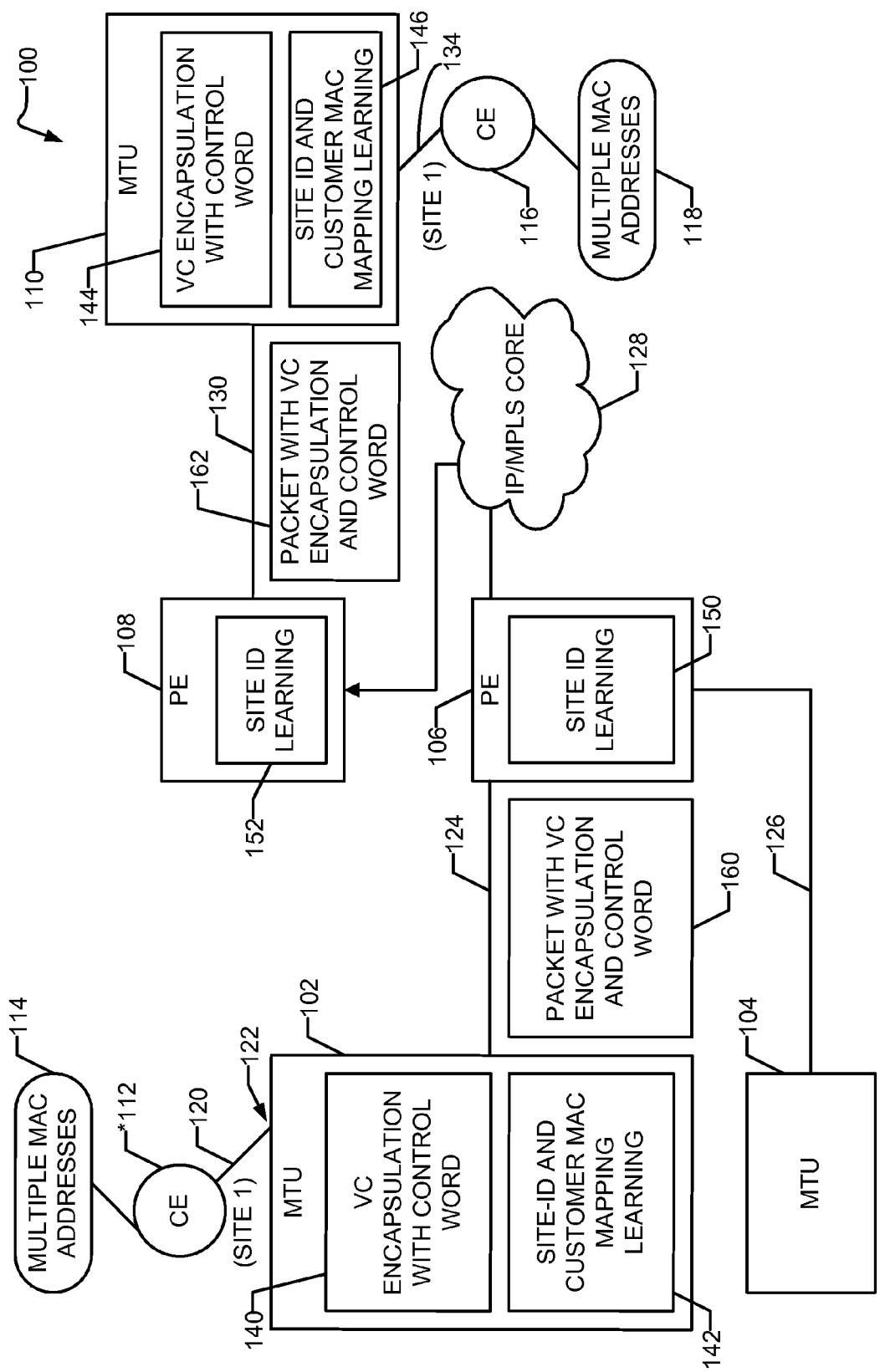
FIG. 1 is a block diagram that illustrates a particular system architecture that provides Ethernet over IP/MPLS.

Referring to FIG. 1, a system 100 is disclosed. The system 100 includes customer equipment 112, multi-tenant unit (MTU) 102, provider edge equipment unit 106, a second provider edge equipment unit 108, internet protocol/multi-protocol label switching core (IP/MPLS) 128, a destination multi-tenant unit 110, and destination customer equipment 116. The customer equipment 112 is located at a first site and is associated with a plurality of medium access control (MAC) addresses 114. The customer equipment 112 at the first site is linked to the MTU 102 via link 120. Data communicated between the CE 112 and the MTU 102 is received at a first port 122 of the MTU 102. The MTU 102 includes a virtual circuit (VC) encapsulation with control word module 140 and a site identification (ID) and customer MAC mapping learning module 142. The provider edge equipment 106 includes site identification learning module 150 and is coupled to another MTU 104 via virtual circuit 126. The first provider edge equipment unit 106 is in communication with the first MTU 102 via virtual circuit 124.

The second provider edge equipment unit 108 also includes a site identification learning module 152 and is coupled to MTU 110 via virtual circuit 130. The MTU 110 includes a site identification and customer MAC mapping learning module 146 and VC encapsulation with control word module 144. The MTU 110 is coupled to customer equipment 116 via data link 134. The customer equipment 116 is located at a second site and is associated with a second plurality of MAC addresses 118.

During operation, data packets originating from the customer equipment 112 at the first site are communicated over data link 120 and the first port 122 to the MTU 102. At the MTU 102, a site identification forte first site of the customer equipment 112 is associated with a plurality of MAC addresses for such customer equipment. In addition, the MTU 102 performs site ID and customer MAC mapping learning 142. The MTU 102 communicates with the provider edge equipment 106 by sending a packet with VC encapsulation and control word 160. The control word 160 includes a source site identification (ID) and a destination identification (ID) associated with the first site where the customer equipment 112 is located. Similarly, the destination ID is associated with the destination site, such as the second site where the customer equipment 116 is located.

The provider edge equipment 106, responsive to receipt of the data packet and control word 160, receives the site ID information, performs site ID learning via module 150, and determines the destination ID for further routing of the packet. Data packets are forwarded by the provider edge equipment 106 via the IP/MPLS core network 128 to far end provider edge equipment, such as provider edge equipment 108. The provider edge equipment 108 further passes a packet with VC encapsulation and control word 162 containing the destination site ID via virtual circuit 130 to the MTU 110. The encapsulated control word packet and the associated data packet for the control word 144 are processed at the MTU 110. The site ID, destination ID, and MAC learning processes 146 are performed, MPLS VC label and control word are striped off and the packet is routed and forwarded to the customer equipment 116 at the second site. Finally, the customer equipment 116 forwards the communicated data to the appropriate equipment based on the particular destination MAC address.

Figure 2:
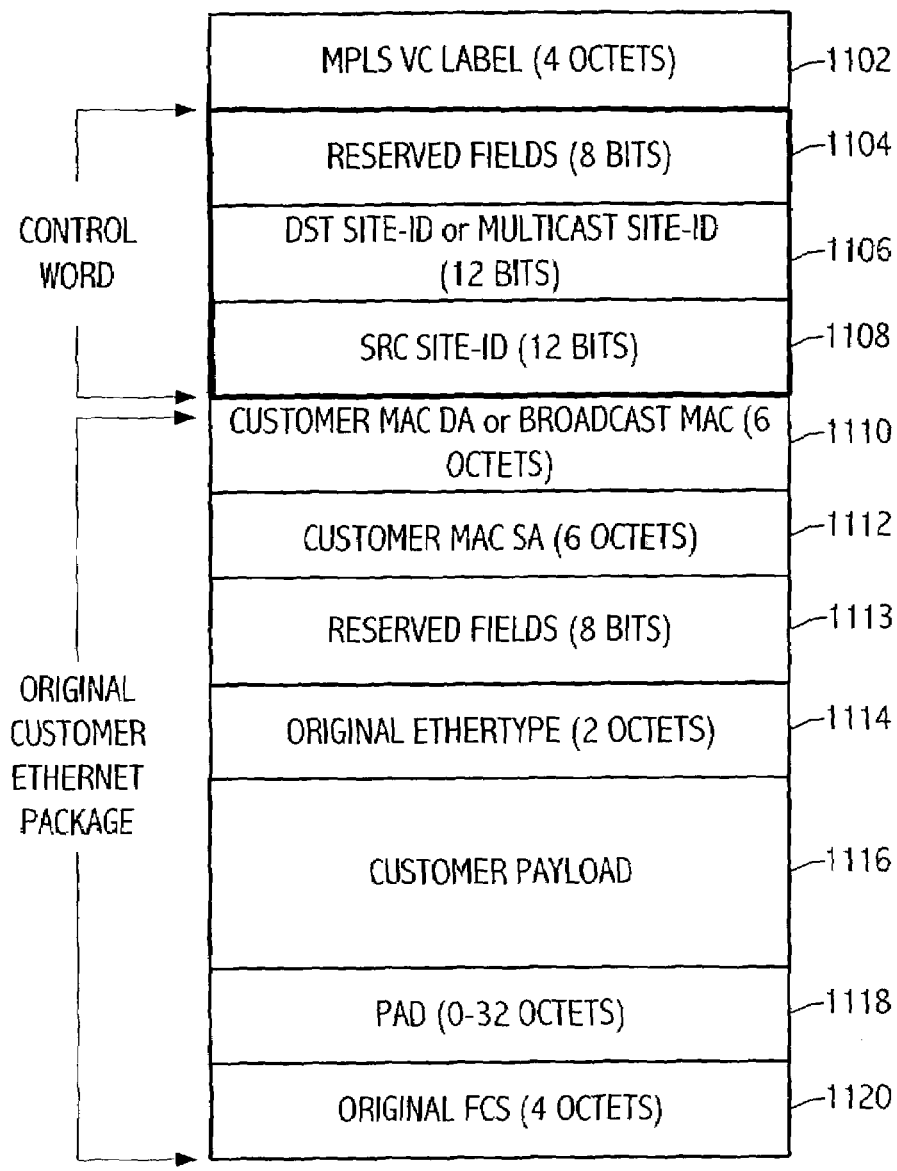
FIG. 2 illustrates an example of a customer packet that can be used where the control word is defined.

FIG. 2 illustrates an example of a customer packet header that can be used where the control word is defined. Field 1102 is for the MPLS VC label and is four octets. Fields 1104 and 1113 are reserved and are each eight bits. Field 1106 is twelve bits for the destination or Multicast site IDs. Field 1108 is for the source ID and is also twelve bits. The illustrated data packet also includes customer destination or broadcast MAC 1110, customer MAC source address 1112, original Ethertype 1114, customer payload 1116, PAD 1118, and original FCS 1120.

Figure 3:
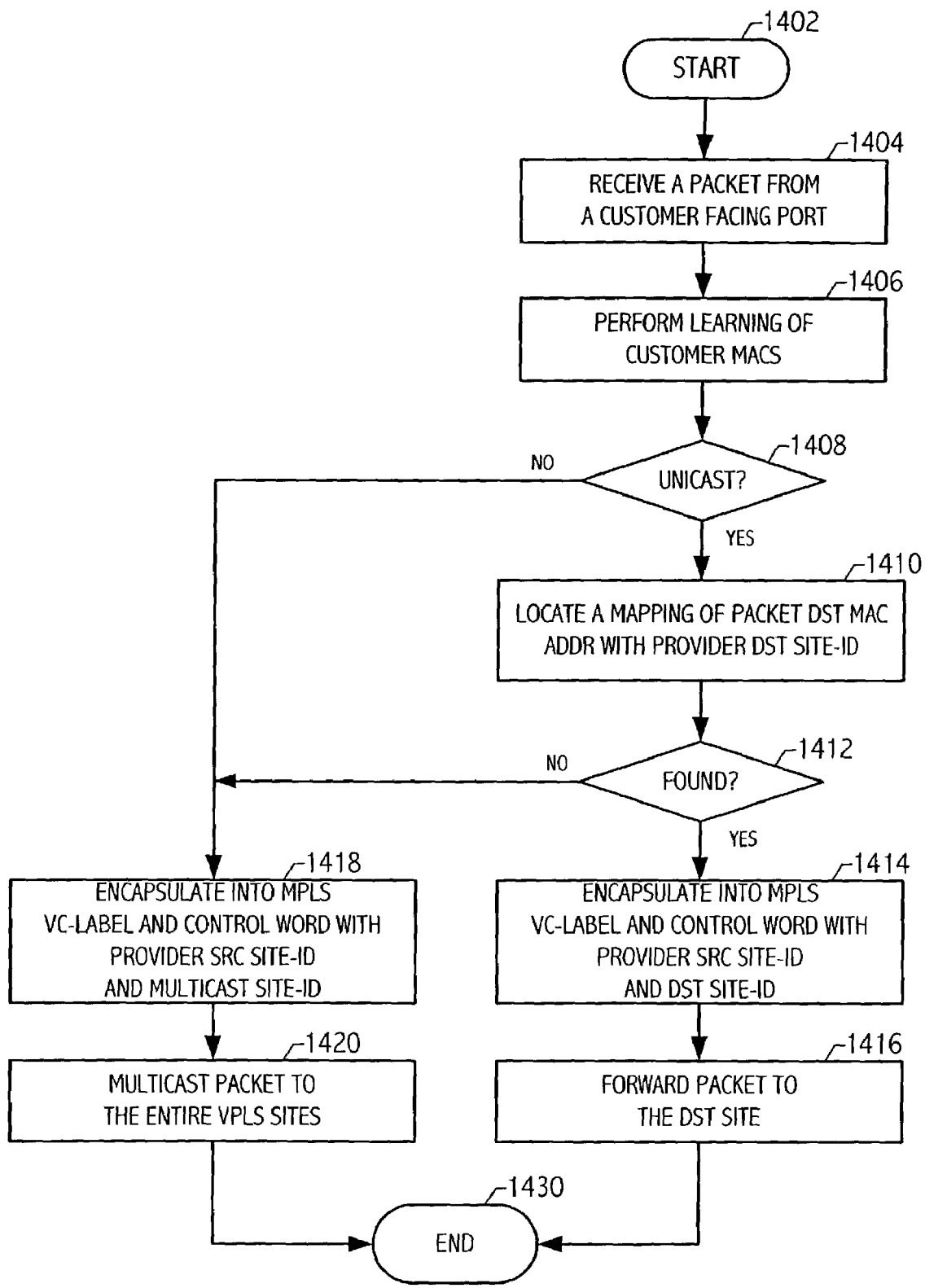
FIG. 3 is a flow diagram illustrating a method of customer packet handling at an ingress MTU point using a control word mode.

Referring to FIG. 3, a method of customer packet handling at an ingress point MTU using a control word is illustrated. A packet is received from a customer facing port at 1404 and customer MAC learning of the packet is performed, at 1406. If the packet is determined to be a unicast packet at decision step 1408, then a mapping of the packet destination MAC address is located with the provider destination site ID, at 1410. If the packet is located as determined by decision step 1412, then the packet is encapsulated into an MPLS frame, the VC label and control word is defined with the provider source ID and destination site ID, at 1414, and the packet is forwarded to the destination site, at 1416. Referring to decision step 1408, where a packet is determined to be a multicast packet, or in the case where decision step at 1412 is negative due to the packet mapping not being located, then processing continues at 1418, where the packet is encapsulated into an MPLS frame, the VC label and control word are populated with the provider source site ID and multicast destination site ID, and the multicast packet is broadcast to the entire set of VPLS sites, at 1420. In either scenario, processing is then completed at step 1430.

Figure 4:
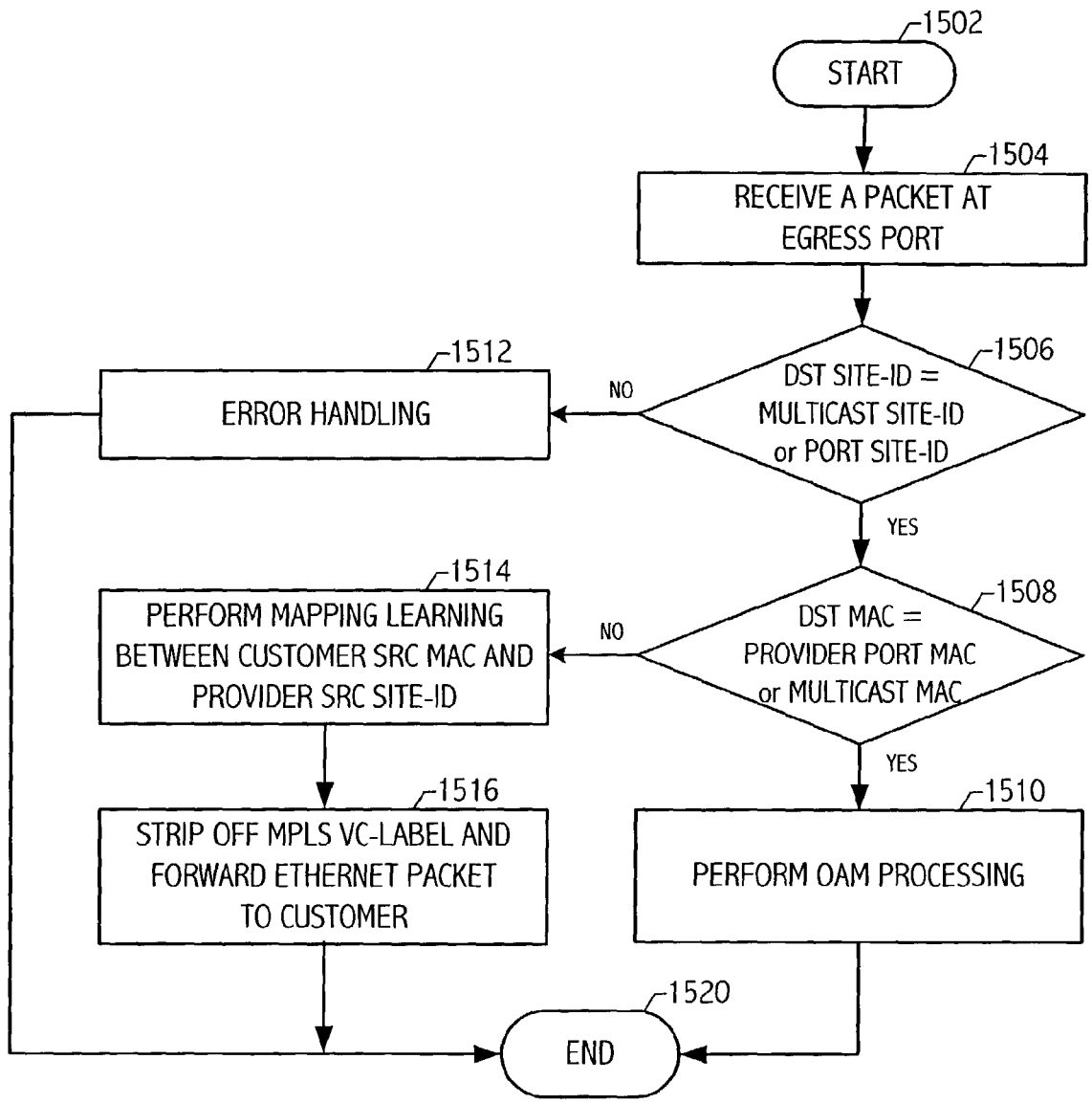
FIG. 4 is a flow diagram illustrating a method for handling packets at an egress MTU point using a control word mode.

Referring to FIG. 4, a method for handling packets at an egress point MTU using a control word mode is illustrated. A packet is received at an egress port MTU, at 1504. The destination site is checked at 1506. If the destination site is not equal to the multicast site ID or the port site ID, at decision step 1506, then error handling is performed at 1512 and processing is completed at 1520. If the destination site is equal to the multicast site ID or port site ID, as determined at decision step 1506, then the destination MAC is compared to the provider port MAC or the multicast MAC, at decision step 1508. Where the destination MAC equals either the provider port MAC or the multicast MAC, then OAM processing is performed at 1510 and the method is completed at 1520. Where the destination MAC is not equal to the provider MAC or multicast MAC, then the method performs learning and mapping between the customer source MAC and the provider site ID, at 1514, thereafter, the MPLS VC-label and control word is stripped off, and the Ethernet packet is forwarded to the customer at 1516. Processing is then completed at 1520.

The present disclosure presents a MPLS encapsulation mechanism with Control Word for providing Hierarchical-Virtual Private Local Area Network Service (H-VPLS) using Ethernet over MPLS. VPLS is a class of layer-2 virtual private network (VPN) services that allow multiple customer sites to be connected over a provider managed IP/MPLS infrastructure, so that customer devices appear to be on the same Local Area Network (LAN). The multi-tenant unit (MTU) device performs MPLS VC encapsulation and customer MAC and provider Site-ID mapping learning.

The MPLS encapsulation technique with Control Word may be used to avoid customer MAC handling on provider edge (PE) devices. A new provider Site-ID is provided to represent one or many customer MAC addresses behind a customer facing port (e.g., behind a MTU). PE devices perform a limited amount of network address learning. The MPLS encapsulation with Control Word also provides for OAM delivery (e.g., to facilitate point-to-point, point-to-multi-point reachability testing, performance measurement, or the like). Customer MAC learning at gateway devices may be beneficially reduced or eliminated when a VPLS service spans multiple domains.

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A distributed computer data network of a service provider, the distributed computer data network comprising:
   a first computing node comprising a source multi-tenant unit (MTU);
   a second computing node comprising a first provider edge device (PE);
   a third computing node comprising a second PE;
   a fourth computing node comprising a destination MTU;
   wherein a data packet is communicated between the first computing node and the second computing node, the data packet including a control word having a provider destination identification corresponding to a location of the fourth computing node, wherein the data packet has a destination medium access control (MAC) address; and
   wherein the second computing node receives the data packet and forwards the data packet to the third computing node in response to processing the provider destination identification to determine the packet destination, and wherein operations administration and maintenance (OAM) processing is performed when the destination MAC address equals a multicast MAC address.

2. The distributed computer network of claim 1, wherein the second computing node comprises a first provider equipment node that includes a first site identification learning module, and the third computing node comprises a second provider equipment node that includes a second site identification learning module.

3. The distributed computer network of claim 1, wherein the first provider edge device is coupled to the second provider edge device via an intermediate label switching data network.

4. The distributed computer network of claim 1, wherein the first computing node comprises:
   an input interface to customer equipment;
   a virtual circuit packet encapsulation module; and
   a control word encapsulation module.

5. The distributed computer network of claim 4, wherein the first computing node further comprises a site identification and a customer medium access control mapping and learning module.

* * * * *